US011595504B2

(12) United States Patent
Fuller et al.

(10) Patent No.: US 11,595,504 B2
(45) Date of Patent: Feb. 28, 2023

(54) MIPI TRANSLATION IN GMSL TUNNEL MODE

(71) Applicant: Maxim Integrated Products, Inc., San Jose, CA (US)

(72) Inventors: Paul Fuller, Frisco, TX (US); Yan Yan, Plano, TX (US); Gary Murdock, Eugene, OR (US); Prem Ramachandran Nayar, Dallas, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 17/375,154

(22) Filed: Jul. 14, 2021

(65) Prior Publication Data

US 2022/0021756 A1 Jan. 20, 2022

Related U.S. Application Data

(60) Provisional application No. 63/052,557, filed on Jul. 16, 2020.

(51) Int. Cl.
*H04L 29/06* (2006.01)
*H04L 69/22* (2022.01)
(Continued)

(52) U.S. Cl.
CPC .............. *H04L 69/22* (2013.01); *H04L 1/004* (2013.01); *H04L 49/109* (2013.01)

(58) Field of Classification Search
CPC ....... H04L 69/22; H04L 1/004; H04L 49/109; H04L 49/9042; H04L 69/04; H04L 1/0618; H04W 28/06; H03M 13/00
See application file for complete search history.

(56) References Cited

U.S. PATENT DOCUMENTS

| 9,584,227 B2 | 2/2017 | Wiley | |
| 2003/0061623 A1* | 3/2003 | Denney | ............... H04L 49/9094 348/192 |

(Continued)

FOREIGN PATENT DOCUMENTS

| WO | 2020129685 A1 | 6/2020 | |
| WO | WO-2020129685 A1 * | 6/2020 | ........... H04L 69/324 |

OTHER PUBLICATIONS

"DS90UB954-Q1 Dual 4.16 Gbps FPD—Link III Deserializer Hub With MIPI CSI—2 Outputs for 2MP/60fps Cameras and RADAR"— Texas Instruments, SNLS5708—Aug. 2017—Revised Dec. 2018, available from the Internet, <URL:https://www.ti.com/lit/ds/symlink/ds90ub954-q1.pdf?ts=1625186459957&ref_url=https%253A%252F%252Fwww.google.com%252F>, (171 pgs).

*Primary Examiner* — Mewale A Ambaye
(74) *Attorney, Agent, or Firm* — North Weber & Baugh LLP; Michael North (57) ABSTRACT

Systems and methods provide secure, end-to-end high-speed data encoding and communication. In certain embodiments, this is accomplished by modifying a header portion of a data packet received from a first device and complying with a one Mobile Industry Processor Interface (MIPI) protocol to create a modified data packet that complies with a faster MIPI protocol. The header portion of the modified data packet is validated during a tunnel mode operation using an error detection process to validate the modified data packet, which can then be securely transmitted to a second device that complies with the faster MIPI protocol.

20 Claims, 8 Drawing Sheets

700

AT A FIRST INTERFACE DESIGNED TO COUPLE TO A FIRST DEVICE, RECEIVE A DATA PACKET THAT COMPLIES WITH A FIRST COMMUNICATION PROTOCOL AND COMPRISES A HEADER PORTION AND A PAYLOAD PORTION, THE HEADER PORTION COMPRISING FIELDS — 705

USE A PROTOCOL CONVERTER TO MODIFY AT LEAST SOME OF THE FIELDS TO GENERATE A MODIFIED DATA PACKET COMPRISING AN ERROR DETECTION OR ERROR CORRECTION FIELD THAT COMPLIES WITH A SECOND COMMUNICATION PROTOCOL — 710

TRANSMIT THE MODIFIED DATA PACKET TO A SECOND INTERFACE DESIGNED TO COUPLE TO A SECOND DEVICE — 715

(51) Int. Cl.
*H04L 1/00* (2006.01)
*H04L 49/109* (2022.01)

(56) References Cited

U.S. PATENT DOCUMENTS

| | | | |
|---|---|---|---|
| 2007/0112995 A1* | 5/2007 | Manula | G06F 13/423 |
| | | | 710/310 |
| 2007/0153785 A1* | 7/2007 | Zeng | H04W 28/06 |
| | | | 370/389 |
| 2015/0016475 A1* | 1/2015 | Govindappa | H04W 28/06 |
| | | | 370/477 |
| 2016/0021224 A1* | 1/2016 | Howe | H04L 63/02 |
| | | | 370/474 |
| 2017/0255579 A1* | 9/2017 | Ngo | G06F 13/364 |
| 2019/0268034 A1* | 8/2019 | Zhao | H04L 69/18 |

* cited by examiner

- DPHY Long Packets
  - Data ID
  - 16-bit Word Count
  - VCX + 6-bit ECC

- Packet Payload
  - 16-bit CRC

- CPHY Long Packets (duplicate header)
  - RES + VCX
  - Data ID
  - 16-bit Word Count
  - 16-bit CRC

- Packet Payload
  - 16-bit CRC

- DPHY Short Packets
  - Data ID
  - 16-bit Word Count
  - VCX + 6-bit ECC

- CPHY Short Packets
  - RES + VCX
  - Data ID
  - 16-bit Word Count
  - 16-bit CRC

MIPI TRANSLATION IN GMSL TUNNEL MODE

CROSS REFERENCE TO RELATED PATENT APPLICATIONS

The present application claims priority benefit, under 35 U.S.C. § 119(e), to and commonly-assigned U.S. Patent Application No. 63/052,557, filed on Jul. 16, 2020, entitled "MIPI TRANSLATION IN GMSL TUNNEL MODE," listing as inventors Paul Fuller, Yan Yan, Gary Murdock and Prem Ramachandran Nayar, which application is herein incorporated by reference as to its entire content.

BACKGROUND

The present disclosure relates generally to secure high-speed data communication systems. More particularly, the present disclosure relates to data transfer and flow control in signal processing systems that utilize packet-based communication protocols for end-to-end communication.

Data packets transmitted to communicate information between system components typically have a packet structure that conforms to some transmission protocol that oftentimes includes a protection mechanism to facilitate reliable data transmission. For example, packet construction as defined by the Mobile Industry Processor Interface (MIPI) standard differs between C-physical-layer (PHY) and D-PHY packets, which utilize different protection algorithms. While D-PHY, which is used for differential signaling, protects packets that use an error correction code (ECC), C-PHY, which uses 3-level signaling, protects packets that use a cyclic redundancy check (CRC). Thus, existing MIPI methods that utilize tunneling mode end-to-end CRC/ECC protection are limited in that sensors, systems-on-chip (SoC), and similar devices must use the same MIPI protocol on both sides of a communication path.

In detail, to achieve end-to-end data protection, a CRC (or ECC) value generated by transmitting component, e.g., a sensor, must be received by a receiving component, e.g., a processor in an SoC, i.e., the same value must be passed through a serializer/deserializer (serdes) path (e.g., comprising serializer, serial link, and deserializer) without modification or regeneration. If a bit error occurs during the transmission from the sensor output to the SoC input using a serdes scheme, which is typically intended to minimize the number of I/O pins and interconnects, the ECC/CRC value on the sensor side of the transmission will not match the ECC/CRC check in the SoC.

While more and more SoCs are C-PHY technology compatible, almost all camera sensors are based on MIPI D-PHY technology, i.e., C-PHY sensors are virtually nonexistent. In practice, this limits end-to-end data protection to D-PHY speeds (e.g., 2.5 Gbps per lane), which are significantly slower than bit rates for C-PHY (e.g., 5.7 Gbps per lane). C-PHY includes an encoding scheme that allows transmission of 2.28 bits per clock cycle, whereas D-PHY transmission is limited to 1 bit per clock cycle. As a result, a common 4-lane C-PHY port can transmit at a significantly higher throughput 4×5.7 Gbps (i.e., 22.8 Gbps). In contrast, a common 4-lane D-PHY port can transmit only 4×2.5 Gbps (i.e., 10 Gbps), which is especially limiting for designs that aggregate multiple video streams in the deserializer and transmit over a MIPI PHY. For example, four GMSL2 6 Gbps (~5.2 Gbps data throughput) cameras would need a greater than 20 Gbps MIPI interface to transmit an aggregated video stream.

Therefore, existing limitations of slower MIPI interfaces prevents system designers from securely transmitting large amounts of data in applications, such as advanced driver assistance system (ADAS) applications, which would greatly benefit from increased camera resolution and frame rates in higher ASIL systems. Accordingly, it would be desirable to have systems and methods that overcome the limitations of otherwise incompatible protocols to enable tunnel mode in end-to-end systems and facilitate reliable, high-bandwidth communication between many interconnected components, such as cameras, displays, and processors, in cell phone, video, automotive, and other applications.

Figure 1:
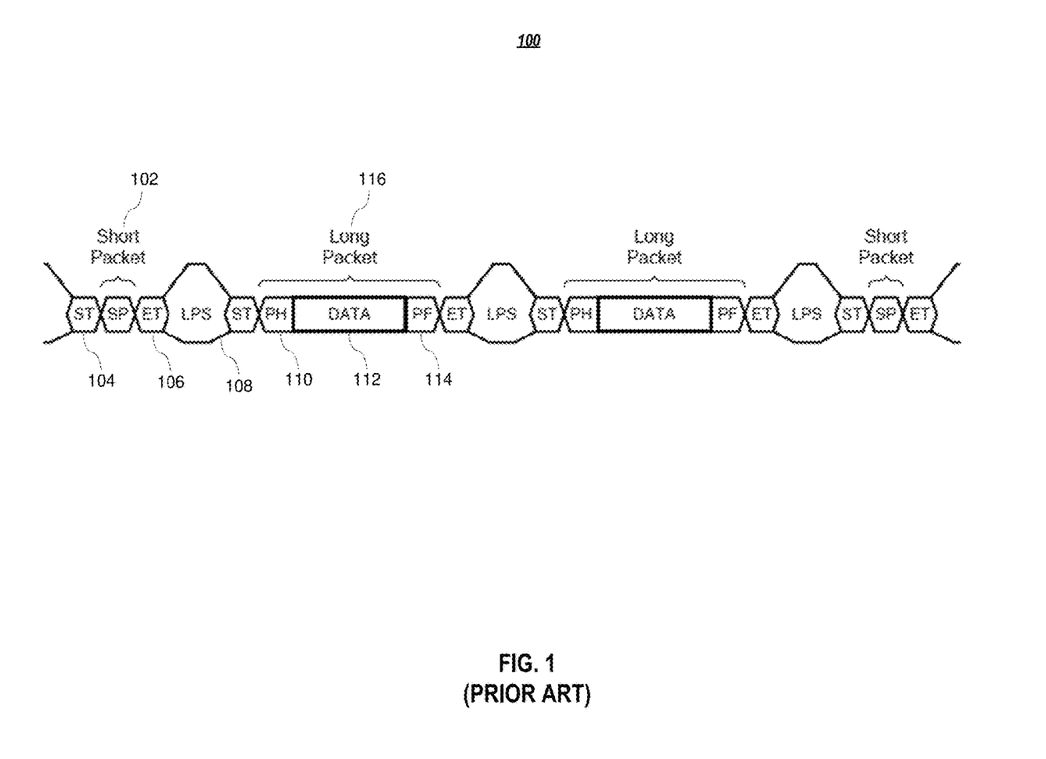
FIG. 1 shows a stream of camera serial interface (CSI)-2 packets in a common data structure according to the MIPI standard.
Figure 2A:
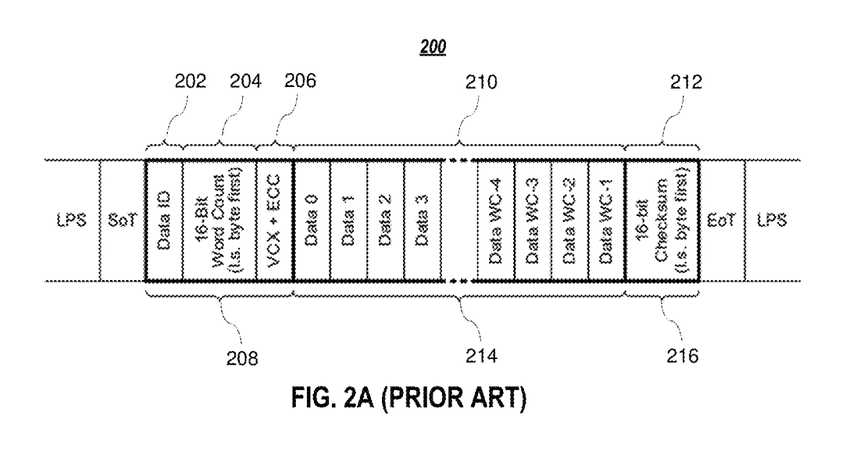
FIG. 2A shows packet header and footer details for a common long packet structure for a D-PHY physical layer.
Figure 2B:
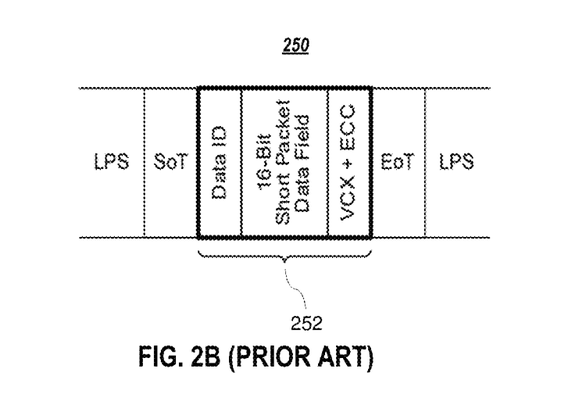
FIG. 2B shows packet header and footer details for a common short packet structure for a D-PHY physical layer.

FIG. 1 shows a stream of CSI-2 packets in a common data structure according to the MIPI standard. Stream 100 comprises short packets 102 and long packets 116 located between start of transmission 104 packets and end of transmission 106 packets comprising data (e.g., 112). As depicted, end of transmission 106 packets may be followed by low-power states 108. Long packets 116 comprise packet header 110, packet footer 114 and, if applicable, packet filler. The CSI-2 packets in stream 100 typically have some low-level protocol features, such as (1) (payload independent) transport of arbitrary data; (2) 8-bit word size; (3) support for up to four interleaved virtual channels on the same link; (4) special packets for frame start, frame end, line start and line end information; (5) descriptor for the type, pixel depth and format of the Application Specific Payload data; (6) 16-bit Checksum Code for error detection; and (7) 8-bit ECC for error correction (D-PHY physical layer only) and detection. Details of the packet header 110 and footer 114 for long packet 116 structure for a D-PHY physical layer are illustrated in FIG. 2A. FIG. 2B shows a header 252 for short packet structure 250 for a D-PHY physical layer.

Data identifier (ID) 202 in long packet structure 200 in FIG. 2A is an 8-bit data identifier (DI) that contains 2-bit Virtual Channel (VC) and 6-bit Data Type (DT) information. VC (bits 7:6) denotes the least significant two bits of the 4-bit Virtual Channel Identifier for the D-PHY physical layer option. DT (bits 5:0) denotes the format/content of the Application Specific Payload Data. Used by the application specific layer. A receiver reads the next 16-bit word count (WC) 204 data words independent of their values. The receiver is does not look for any embedded sync sequences within the payload data and uses the WC value to determine the end of the Packet Payload. 6-bit error correction code (ECC) in field 206 (bits 5:0) enables 1-bit errors within the 32-bit packet header 208 to be corrected and 2-bit errors to be detected. 2-bit VC Extension (VCX). VCX in field 206 (bits 7:6) is the most significant two bits of the 4-bit VC Identifier for the D-PHY physical layer option. Application specific payload 210 comprises packet data 214 having a length that equals the word count (WC) times the data word width (8-bits). There are no restrictions on the values of the data words. Checksum/CRC 212 comprises a 16-bit packet footer 216.

Figure 3A:
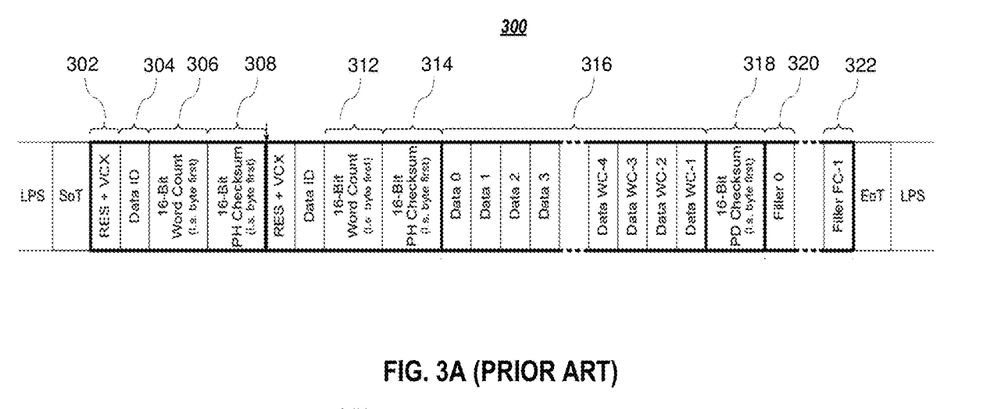
FIG. 3A shows packet header and footer details for a long packet structure for a C-PHY physical layer.

Packet header and footer details for long and packet structure for a C-PHY physical layer are illustrated in FIG. 3A. 5-bit Reserved Field (RES) (bits 7: 3) in field 302 is set to zero and reserved for future use. The 3-bit VCX field (bits 2:0) in field 302 is the most significant three bits of the 5-bit VC Identifier for the C-PHY physical layer option. 8-bit DI 304, used by the application specific layer, contains the 2-bit VC and the 6-bit DT Information. VC (bits 7:6) is the least significant two bits of the 5-bit Virtual Channel Identifier for the C-PHY physical layer option. DT (bits 5:0) denotes the format/content of the Application Specific Payload Data.

Regarding the 16-bit WC 306, 312 the receiver reads the next WC 8-bit data words following the Packet Header and uses the WC value to determine the end of the Packet Payload. 16-bit CRC Code 308, 314 for the Packet Header is computed over the Reserved, Data ID, and Word Count fields (4 bytes) to enable detecting multi-bit errors. The physical layer simultaneously inserts a sync word on all N lanes after CRC code 308, 314, as a result of executing a CSI-2 PPI command.

The 16-bit packet footer comprises a 16-bit packet data CRC 318 that is computed over WC packet data words. Packet footer 318 is followed by filler 320, 322 that comprises FC 8-bit bytes added to ensure that all lanes transport the same number of 16-bit words. Application specific payload 316 comprises packet data having a length that equals the WC*data word width (8-bits). As with the D-PHY packet structure, there are no restrictions on the values of the data words.

Figure 3B:
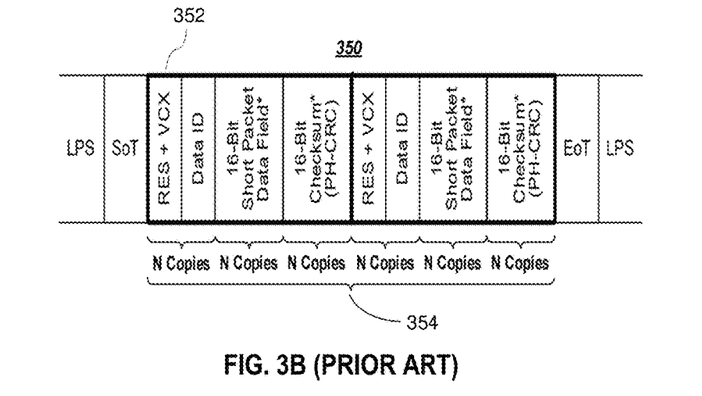
FIG. 3B shows packet header and footer details for a short packet structure for a C-PHY physical layer.

FIG. 3B illustrates the details of the short packet structure for a C-PHY physical layer. VCX field 352 is LS 3 bits and all RES are zero. Short packet 350 has 6N×16-bits 350, where N is the physical layer count. The physical layer simultaneously inserts a 7-symbol sync word on all N lanes after the 16-bit CRC code, in response to a single CSI-2 PPI command.

The C-PHY and D-PHY protocols not only use slightly different header information, but they also use different protection algorithms. The D-PHY packet header is protected with a 6-bit ECC value, whereas the C-PHY packet header is protected with a 16-bit CRC value. The data protected in the header information is the same with the exception of the 5-bit "RES" field in C-PHY packets. This field is reserved for "future use" and as of the CSI-2 v3.0 spec release, all 5 bits are set to zero.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments.

DETAILED DESCRIPTION OF THE PREFERRED EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably. The terms "packet" or "frame" shall be understood to mean a group of bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell."

It shall be noted that: (1) certain steps may optionally be performed; (2) steps may not be limited to the specific order set forth herein; (3) certain steps may be performed in different orders; and (4) certain steps may be done concurrently.

Figure 4A:
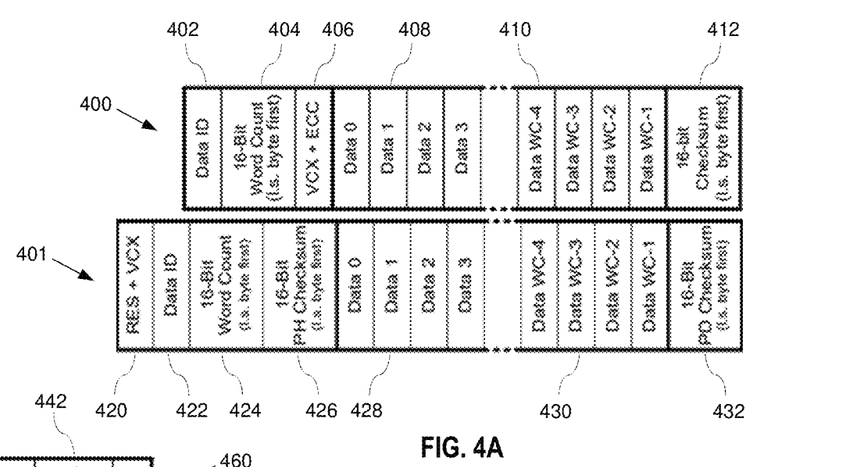
FIG. 4A illustrates an exemplary mapping between a long packet structure physical layer D-PHY data packet and a long packet structure physical layer C-PHY data packet according to various embodiments of the present disclosure.

FIG. 4A illustrates an exemplary mapping between a long packet structure physical layer D-PHY data packet and a long packet structure physical layer C-PHY data packet according to various embodiments of the present disclosure. D-PHY data packet 400 comprises data identifier 402 that, as shown in FIG. 4C, may comprise 2-bit VC identifier 482 and 6-bit DT information 484. D-PHY data packet 400 in FIG. 4A further comprises 16-bit word count 404; ECC and VCX field 206, wherein ECC may enable bit error detection and correction in the packet header that comprises fields 402-406; payload 408-410, e.g., 8-bit wide pixel data; and packet footer 412. In contrast, C-PHY data packet 401 comprises RES and VCX field 420; data identifier 422; 16-bit word count 424; 16-bit checksum 426, wherein the packet header comprises fields 420-426; payload 428-430; and packet footer 432.

Figure 4B:
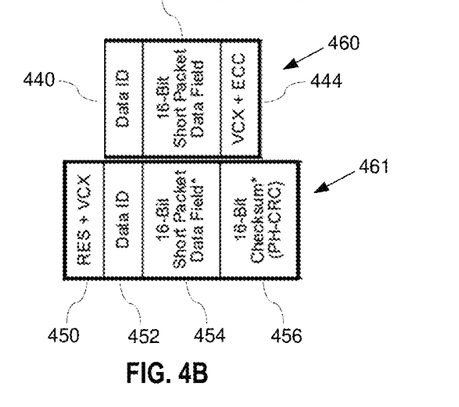
FIG. 4B illustrates an exemplary mapping between a short packet structure physical layer D-PHY data packet and a short packet structure physical layer C-PHY data packet according to various embodiments of the present disclosure.
Figure 5:
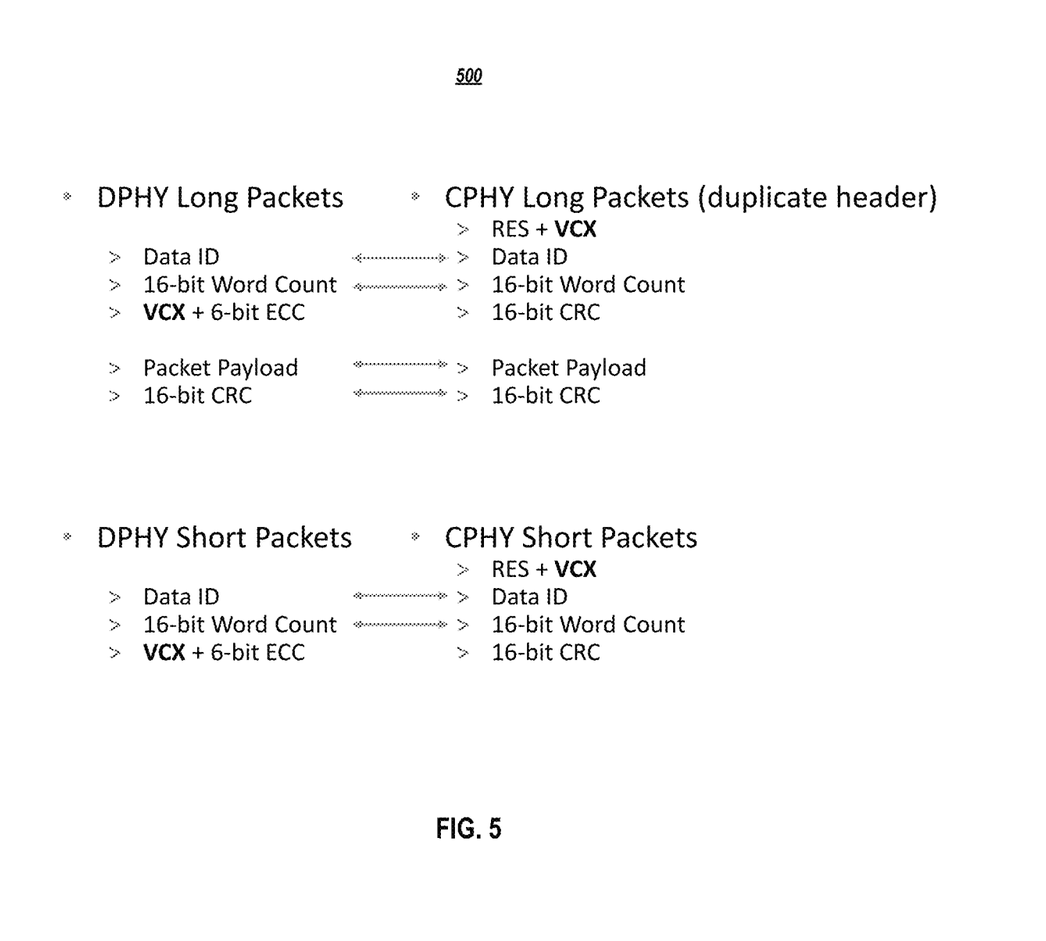
FIG. 5 illustrates an exemplary mapping between D-PHY and C-PHY for respective long and short packets according to various embodiments of the present disclosure.

In embodiments, as illustrated in FIG. 5, which summarizes exemplary mapping between D-PHY and C-PHY for respective long and short packets according to various embodiments of the present disclosure, data identifier 402 and 16-bit word count 404 in long packet structure physical layer D-PHY data packet 400 in FIG. 4A may be directly mapped into respective data identifier 422 and 16-bit word count 424 in long packet structure physical layer C-PHY data packet 401. Similarly, data identifier 440 and 16-bit short packet data field 442 in short packet structure physical layer D-PHY data packet 460 in FIG. 4B may be directly mapped into respective data identifier 452 and 16-bit short packet data field 454 in short packet structure physical layer C-PHY data packet 461.

As can be gleaned from FIG. 5, which highlights the similarities and differences in the header and packet structures for D-PHY and C-PHY long and short packets, header structures for D-PHY and C-PHY long and short packets comprise 16-bit word counts and a VCX. The two main differences between D-PHY and C-PHY header packets, for both long and short packets, are that (1) ECC data—a calculated number based on certain header data information—does not match the CRC data—a calculated number that is based on other header data information, and (2) the reserved field, RES, which exists in C-PHY header packets but not in D-PHY header packets.

It is noted that since C-PHY and D-PHY protocols use different header information, packet structures, and data protection mechanisms dictated by each protocol, in existing systems and applications such as those using pixel mode in which pure pixel data is transmitted without much concern for data protection, packets sent by a device at one end of a communication path and obtained by a serializer are not the same as the packets output by a deserializer to another device at the other end of the communication path, which raises issues of possible data loss during transmission (e.g., along a 15 m cable), undetected data corruption, etc.

In contrast, embodiments presented herein translate portions of a data packet that protect data transmitted from one format complying with one protocol (e.g., D-PHY) to another format complying with a different protocol (e.g., C-PHY) in accordance with FIG. 4A-C and FIG. 5 to harmonize otherwise incompatible protocols to enable reliable high-speed end-to-end communication for safety-critical applications. Various embodiments take advantage of the fact that certain data in the C-PHY and D-PHY headers are similar or the same.

Figure 6:
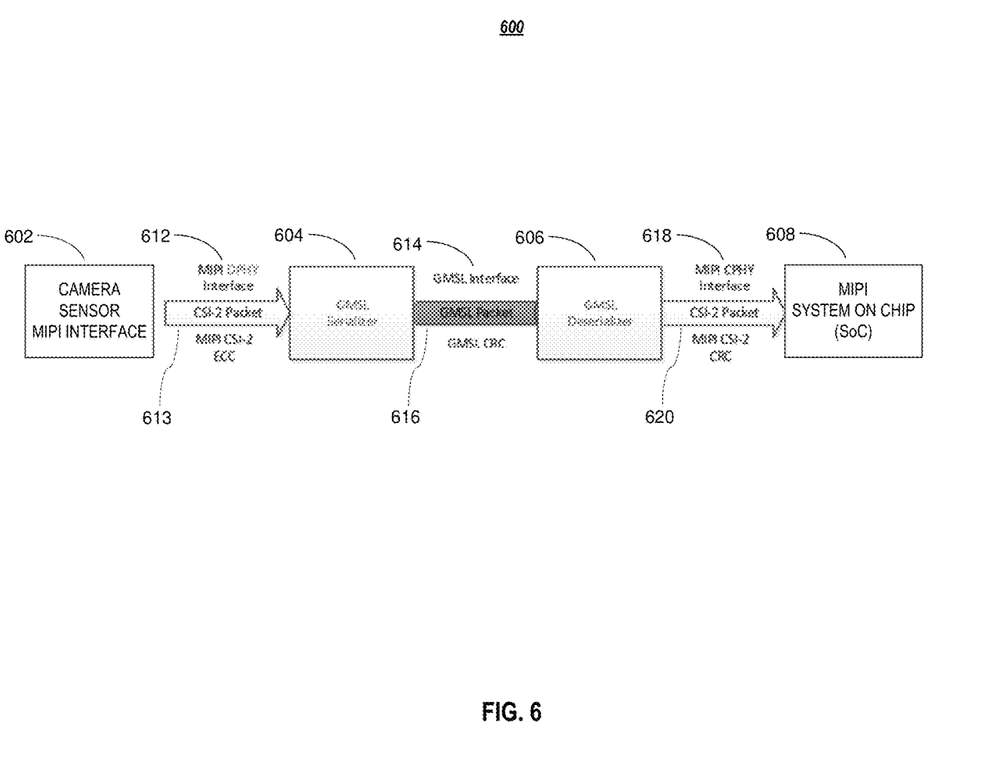
FIG. 6 illustrates and exemplary communication system according to various embodiments of the present disclosure.

FIG. 6 illustrates an exemplary communication system according to various embodiments of the present disclosure. As depicted, communication system 600 comprises camera sensor 602 that may be any device that generates or processes image data, such as LIDAR or radar data; communication serializer 604, e.g., a multi-port GMSL serializer; communication interface 612, e.g., a MIPI D-PHY interface; and link 614, e.g., a bidirectional GMSL interface that may be implemented, e.g., by a single coaxial cable or shielded-twisted pair cables. Communication system 600 may further comprise deserializer 606 that outputs data 620, e.g., a deserialized GMSL stream, at output interface 618, e.g., a MIPI C-PHY interface, designed to couple to MIPI SoC 608 or any other processing device.

Although not shown in FIG. 6, it is understood that other and additional components, such as microcontrollers, memory devices, etc., may be employed, for example to program serializer 604, deserializer 606, or any peripheral device, such as to aid in data aggregation, conversion, encryption, and perform signal processing and auxiliary functions to accomplish the objectives of the present disclosure. For example, a serialized stream may comprise a reference clock signal that may be provided by a phase lock loop (PLL) oscillator. Serializer 604 and/or deserializer 606 may comprise a protocol converter that converts at least some (e.g., a header) of a data packet that is compatible with one protocol to be compatible with another protocol according to various embodiments of the present disclosure.

In embodiments, in response to data packets 613 arriving at serializer 604, e.g., on differential data lanes on communication interface 612, serializer 604 may serialize data packets 613 and transmit serialized data 616, e.g., one bit at a time over a single wire and at a relatively high rate. The transmitted data 616 may be received and processed at deserializer 606, e.g., at a relatively higher rate, using a C-PHY-based protocol, before being fed to SoC 608 for further image, audio, etc., processing.

It is understood interface 612 represents a number of interfaces that receive data packets from any number of sources and that serialized data 616 may be aggregated with data from any number of communication serializers (e.g., 604). It is further understood that many existing standards and types of protocols that may be based on different data structures may equally benefit from the teachings of the present disclosure even if not expressly mentioned herein.

In embodiments, camera sensor 602 may generate MIPI D-PHY packet 613 that comprises a MIPI D-PHY CSI-2 ECC value in its header and provide packet 613 to serializer 604, e.g., at communication interface 612. In response to serializer 604 receiving from camera sensor 602, at communication interface 612, a to-be-transmitted MIPI D-PHY CSI-2 packet 613, serializer 604 may convert received packets, e.g., into a serialized GMSL stream of packets 616 that may be provided over a wired GMSL interface to deserializer 606. In embodiments, serializer 604 may extract the incoming ECC value from packet 613 and perform an error check or error correction, e.g., according to the D-PHY protocol, by using a D-PHY algorithm that calculates an ECC value and compares it to the ECC value in the received header, for example, to verify that the data ID, word count, and VCX in the D-PHY packet have been correctly transmitted to serializer 604.

In embodiments, in a pixel transmission mode, serializer 604 may, in response to verifying an incoming MIPI D-PHY CSI-2 ECC, strip the ECC from CSI-2 packet 613 and transmit essentially only pixel data (e.g. 616) to deserializer 606. In embodiments, independent of transmission mode, to protect data traveling on link 614, prior to transmitting the stripped packets over link 614, serializer 604 may protect such packets by adding (e.g., appending) a CRC (e.g., a GMSL CRC) to the packet.

In embodiments, deserializer 606, in response to receiving a MIPI CSI-2 packet that comprises a GMSL CRC, may remove the CRC, e.g., after a CRC check that determines whether the CSI-2 CRC value matches the data. In addition, deserializer 606 may generate and/or add a C-PHY CRC to the packet before communicating it to SoC 608 via MIPI C-PHY interface 618.

Figure 4C:
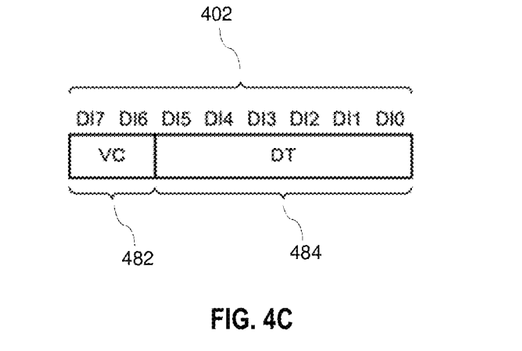
FIG. 4C illustrates an exemplary data identifier according to embodiments of the present disclosure.

In embodiments, once a translation or conversion mode has been enabled, serializer 604 or deserializer 606 may re-order a received D-PHY packet header such as to convert it into a new packet header that comprises a C-PHY packet header structure having a 16-bit CRC field, in accordance with FIG. 4A-B and FIG. 5. (Conversely, a C-PHY header packet may be re-ordered into a D-PHY packet header having a 6-bit ECC value). The C-PHY CRC may protect against data corruption, e.g., between serializer 604 checking the D-PHY ECC and deserializer 606 generating the C-PHY MIPI CSI-2 packet. In this manner, communication system 600 may ensure that the header data in a newly formed C-PHY packet header matches the incoming D-PHY MIPI CSI-2 packet. In embodiments, to form the C-PHY packet header, the data ID and the word count of the D-PHY packet may be used to directly translate to corresponding fields of the C-PHY header. According to FIG. 4A-B and FIG. 5, in embodiments, when translating the VCX, a bit (e.g., a zero) may be added to satisfy the C-PHY protocol that, unlike the D-PHY protocol, uses a third bit to allow 32 options for VCX. In addition, the RES values may be set to zero. It is noted that, in pixel mode, data fields in a packet that contain pixel data need not be modified.

In embodiments, based on the order of the newly generated C-PHY packet and its header information and, before the packet is transmitted, an internal or local CRC (e.g., a 16-bit CRC) may be generated, e.g., by checking the data in the header of the generated C-PHY packet. This may be accomplished by calculating a CRC value and comparing it against the data in the incoming D-PHY packet to ensure that the data in the two packets match each other or, stated differently, that the D-PHY packet has been correctly translated to a C-PHY packet and is free of bit errors, thereby, ensuring data integrity. The newly formed packet may then be transmitted to SoC 608 for further processing. In embodiments, if the CRC operation does reveal a bit error that may have occurred on the line (which unlike for ECC is generally not correctable), some predetermined action may be taken, e.g., a flag may be raised, and the defective packet may be dropped.

In embodiments, instead of receiving from camera sensor 602 a to-be-transmitted MIPI D-PHY CSI-2 packet 612, serializer 604 may receive a MIPI C-PHY CSI-2 packet (not shown) comprising a MIPI C-PHY CSI-2 CRC value in its header. In pixel mode, serializer 604 may extract the CRC value from the packet, perform an error check according to the C-PHY protocol to calculate a CRC value that is compared it to the CRC value in the received header. In response to verifying the CRC, serializer 604 may strip the CRC from the CSI-2 packet, add a GMSL CRC to protect data traveling on link 614 and convert the data into a serialized stream of packets before transmitting the MIPI CSI-2 pixel data that comprises an added GMSL CRC to deserializer 606. Deserializer 606 may then perform a CRC check to determine whether the CSI-2 CRC value matches the data; remove the GMSL CRC; and add a D-PHY ECC to the packet before communicating it to SoC 608 via a MIPI D-PHY interface (not shown).

In embodiments, communication system 600 may operate in a tunnel mode that facilitates end-to-end ECC or CRC protection from camera sensor 602 to SoC 608. In tunnel mode, in response to verifying an incoming MIPI D-PHY CSI-2 ECC, serializer 604 may transmit the entire MIPI CSI-2 packet, including the D-PHY ECC, in a pass-through fashion, e.g., after adding a GMSL CRC to the D-PHY CSI-2 packet. As in pixel mode, in response to receiving the packet comprising the GMSL CRC, deserializer 606 may perform a CRC check; remove the D-PHY CRC; check and remove the D-PHY ECC; and add a C-PHY CRC to the MIPI CSI-2 packet to generate a C-PHY MIPI CSI-2 packet before communicating it, via MIPI C-PHY interface 618, to SoC 608.

It is noted although examples herein are depicted as utilizing only one deserializer 606, this is not intended as a limitation on the scope of the present disclosure since any number of deserializers (e.g., 606) may be used. Accordingly, embodiments may utilize, for example, dual or quad deserializers that each may have a suitable number of MIPI ports and that may be frame synced to aggregate video streams. It is further noted that, e.g., for redundancy purposes, the header information in the modified data packet may be transmitted to the second interface more than once, e.g., based on the number of lanes and/or the mode of communication used.

Figure 7:
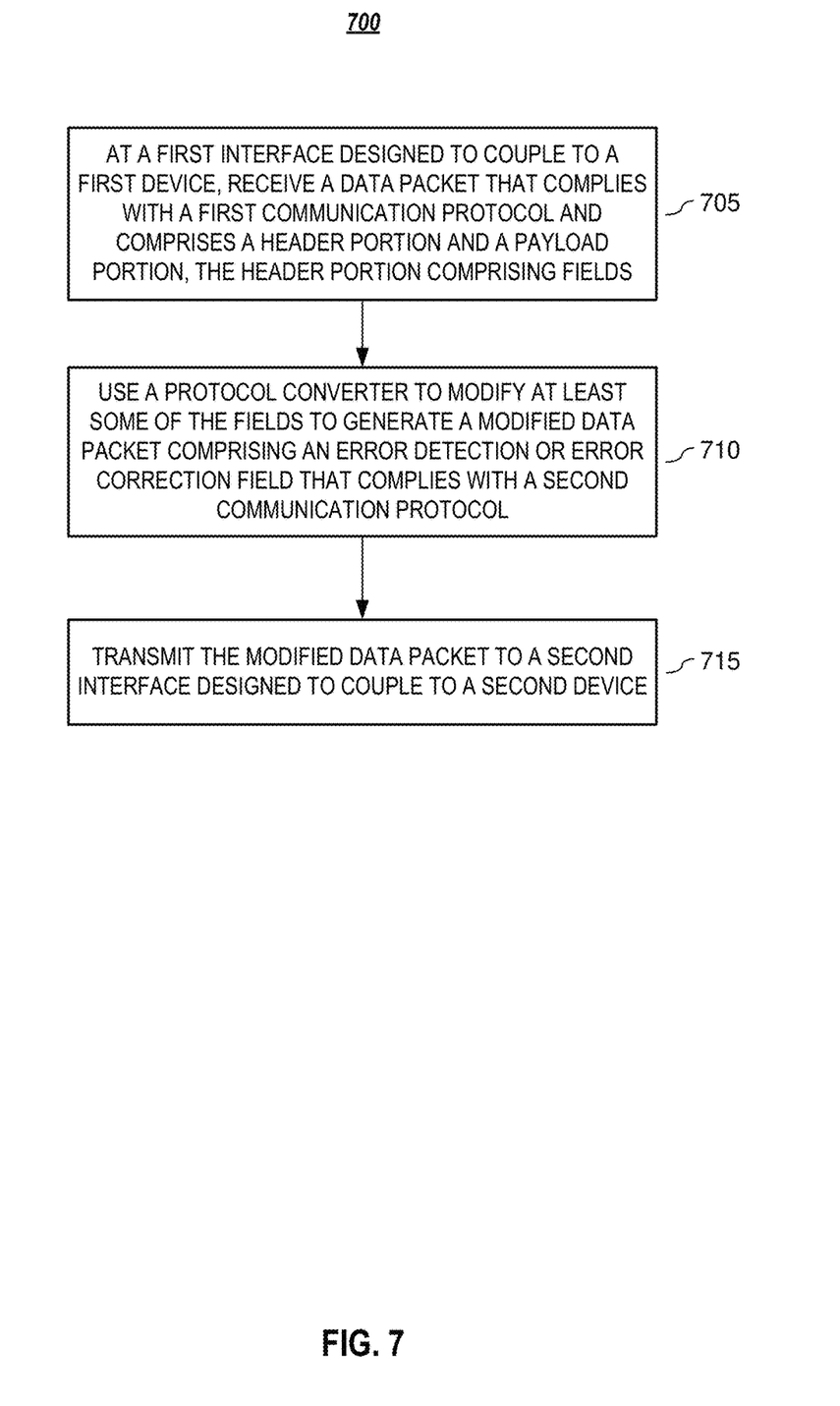
FIG. 7 is a flowchart for an exemplary high-speed data communication process according to various embodiments of the present disclosure.

FIG. 7 is a flowchart for an exemplary high-speed data communication process according to various embodiments of the present disclosure. In embodiments, process 700 may begin at step 705 when, at a first interface, e.g., in a serializer interface designed to couple to a first device such as a camera, a data packet is received that complies with a first communication protocol, e.g., a D-PHY protocol, comprising a header portion and a payload portion.

In embodiments, the header portion may comprise fields that, at a second step 710, a protocol converter may modify, e.g., depending on a transmission type, by replacing, removing, or adding fields and/or bits, to generate a modified data packet that comprises an error detection or error correction field (e.g., a CRC or ECC field that may be based on some of the modified fields) that may comply with a second communication protocol, e.g., a C-PHY protocol.

Finally, at step 715, the modified data packet may be transmitted to a second interface (e.g., in a deserializer) that is designed to couple to a second device, e.g., a processor in a SoC.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more disk drives, one or more network ports for communicating with external devices as well as various input and output (I/O) devices, such as a keyboard, mouse, stylus, touchscreen, and/or video display. The computing system may also include one or more buses operable to transmit communications between the various hardware components.

Figure 8:
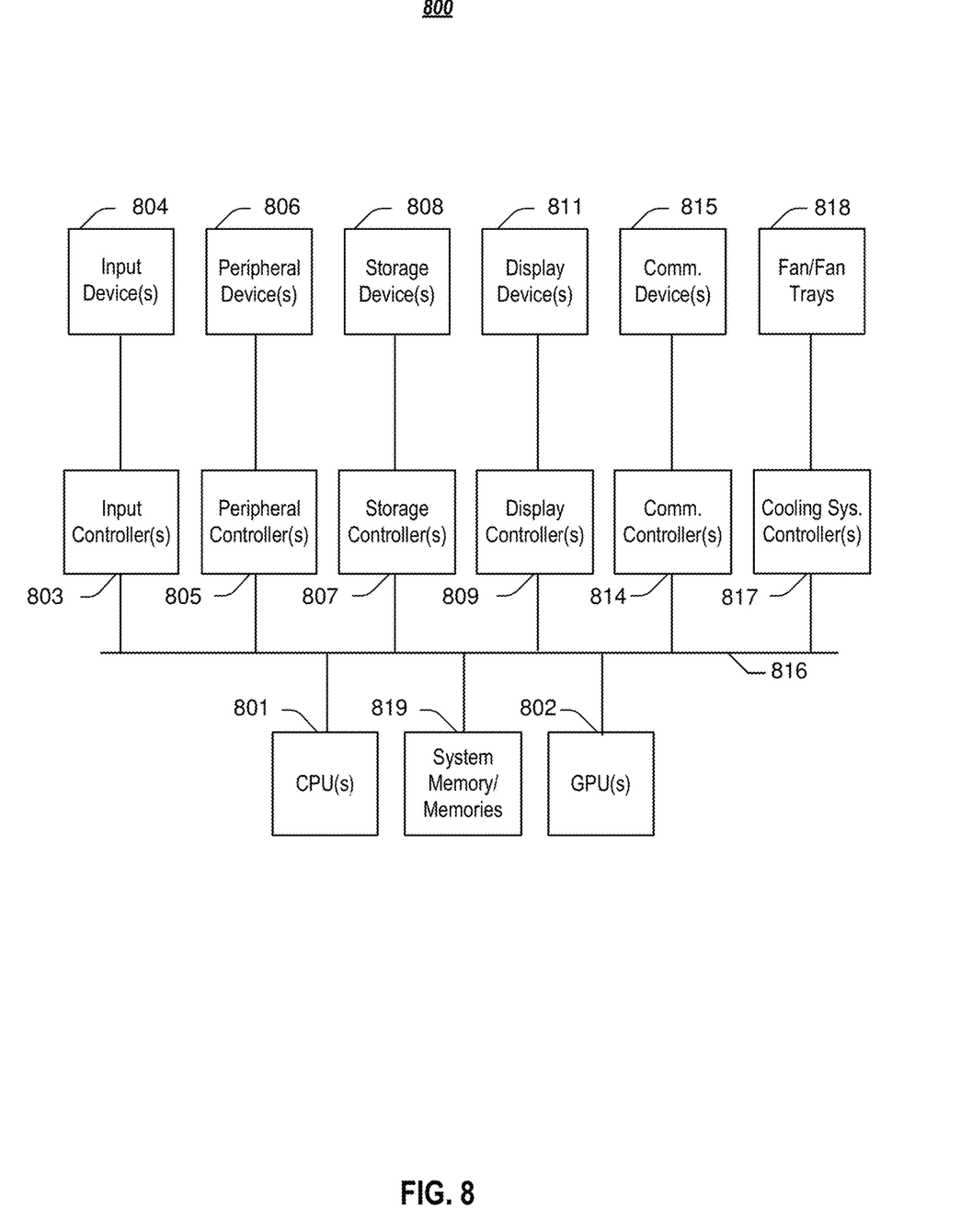
FIG. 8 depicts a simplified block diagram of an information handling system according to embodiments of the present invention.

FIG. 8 depicts a simplified block diagram of an information handling system (or computing system), according to embodiments of the present disclosure. It will be understood that the functionalities shown for system 800 may operate to support various embodiments of a computing system—although it shall be understood that a computing system may be differently configured and include different components, including having fewer or more components as depicted in FIG. 8.

As illustrated in FIG. 8, the computing system 800 includes one or more central processing units (CPU) 801 that provides computing resources and controls the computer. CPU 801 may be implemented with a microprocessor or the like and may also include one or more graphics processing units (GPU) 802 and/or a floating-point coprocessor for mathematical computations. In one or more embodiments, one or more GPUs 802 may be incorporated within the display controller 809, such as part of a graphics card or cards. The system 800 may also include a system memory 819, which may comprise RAM, ROM, or both.

A number of controllers and peripheral devices may also be provided, as shown in FIG. 8. An input controller 803 represents an interface to various input device(s) 804, such as a keyboard, mouse, touchscreen, and/or stylus. The computing system 800 may also include a storage controller 807 for interfacing with one or more storage devices 808 each of which includes a storage medium such as magnetic tape or disk, or an optical medium that might be used to record programs of instructions for operating systems, utilities, and applications, which may include embodiments of programs that implement various aspects of the present disclosure. Storage device(s) 808 may also be used to store processed data or data to be processed in accordance with the disclosure. The system 800 may also include a display controller 809 for providing an interface to a display device 811, which may be a cathode ray tube (CRT) display, a thin film transistor (TFT) display, organic light-emitting diode, electroluminescent panel, plasma panel, or any other type of display. The computing system 800 may also include one or more peripheral controllers or interfaces 805 for one or more peripherals 806. Examples of peripherals may include one or more printers, scanners, input devices, output devices, sensors, and the like. A communications controller 814 may interface with one or more communication devices 815, which enables the system 800 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 800 comprises one or more fans or fan trays 818 and a cooling subsystem controller or controllers 817 that monitors thermal temperature(s) of the system 800 (or components thereof) and operates the fans/fan trays 818 to help regulate the temperature.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A secure and end-to-end high-speed data communication method comprising:
   receiving from a first device a data packet that complies with a first Mobile Industry Processor Interface (MIPI) protocol, the data packet comprising a header portion and a payload portion;
   modifying the header portion of the data packet to create a modified data packet that complies with a second MIPI protocol;
   validating the header portion of the modified data packet during a tunnel mode operation to validate the modified data packet based on an error detection process that is applied to at least one field within the header portion to obtain a validated modified data packet; and
   transmitting the validated modified data packet to a second device that complies with the second MIPI protocol.

2. The method of claim 1, wherein the first MIPI protocol is a D-physical layer (PHY) protocol and the second MIPI protocol is a C-PHY protocol, or vice versa.

3. The method of claim 1, wherein the first interface couples the first device to a serializer, and the second interface couples the second device to a deserializer.

4. The method of claim 3, wherein the serializer and the deserializer communicate over a bidirectional link that supports the first and second MIPI protocols, the second device comprising a processor that is implemented on a system-on-chip (SoC).

5. The method of claim 1, wherein the modified data packet is generated by modifying at least one of a number of fields or a number of bits in one or more fields.

6. The method of claim 1, wherein the error detection process comprises at least one of a cyclic redundancy check (CRC) or an error correction code (ECC).

7. The method of claim 6, further comprising performing an internal CRC checksum by using at least one of a data identifier, a word count, or a virtual channel extension.

8. A high-speed serializer comprising:
   an input interface that couples to a first device, the input interface receives a data packet that complies with a first Mobile Industry Processor Interface (MIPI) protocol, the data packet comprising a header portion and a payload portion;
   a protocol converter coupled to the input interface, the protocol converter modifies the header portion of the data packet to create a modified data packet that complies with a second MIPI protocol;
   an error detector coupled to receive the modified data packet, the error detector validates the modified data packet based during tunnel mode operation based on an error detection process that is applied to at least one field within the header portion to obtain a validated modified data packet; and
   an output interface that couples to a second device, the output interface transmits the validated modified data packet to the second device, the second device being compliant with the second MIPI protocol.

9. The high-speed serializer of claim 8, wherein the first MIPI protocol is a D-physical layer (PHY) protocol and the second MIPI protocol is a C-PHY protocol, or vice versa.

10. The high-speed serializer of claim 8, wherein the output interface couples the second device to a deserializer.

11. The high-speed serializer of claim 10, wherein the high-speed serializer communicates with the deserializer over a bidirectional link that supports the first and second MIPI protocols, the second device comprising a processor that is implemented on a system-on-chip (SoC).

12. The high-speed serializer of claim 10, wherein the protocol converter is coupled to at least one of the serializer or the deserializer.

13. The high-speed serializer of claim 8, wherein the modified data packet is generated by modifying at least one of a number of fields or a number of bits in one or more fields.

14. The high-speed serializer of claim 8, wherein the error detection process comprises at least one of a cyclic redundancy check (CRC) or an error correction code (ECC).

15. A secure and end-to-end high-speed data encoding and communication method comprising:
   receiving from a first device a D-physical layer (PHY) data packet that comprises a header portion and a payload portion;
   modifying the header portion of the D-PHY data packet to create a C-PHY data packet;
   validating the header portion of the C-PHY data packet during a tunnel mode operation to validate the C-PHY data packet based on an error detection process that is applied to at least one field within the header portion to obtain a validated C-PHY data packet; and
   transmitting the validated C-PHY data packet to a second device that complies with a second MIPI protocol.

16. The method of claim 15, wherein the first interface couples the first device to a serializer, and the second interface couples the second device to a deserializer.

17. The method of claim 16, wherein the serializer and the deserializer communicate over a bidirectional link that supports the first and second MIPI protocols, the second device comprising a processor that is implemented on a system-on-chip (SoC).

18. The method of claim 15, wherein the C-PHY data packet is generated by modifying at least one of a number of fields or a number of bits in one or more fields.

19. The method of claim 15, wherein the error detection process comprises at least one of a cyclic redundancy check (CRC) or an error correction code (ECC).

20. The method of claim 19, further comprising performing an internal CRC checksum by using at least one of a data identifier, a word count, or a virtual channel extension.

* * * * *